(12) United States Patent
Itou et al.

(10) Patent No.: US 6,361,895 B1
(45) Date of Patent: Mar. 26, 2002

(54) FUEL CELL STACK WITH FASTENING MEANS INCLUDING SUPPORT MEMBERS AND FLANGES

(75) Inventors: Hideki Itou; Toshirou Kobayashi; Takuya Moriga; Tomoyuki Kajiwara, all of Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/549,003

(22) Filed: Apr. 14, 2000

(30) Foreign Application Priority Data

Apr. 16, 1999 (JP) ............................................ 11-109186

(51) Int. Cl.7 ................................................ H01M 2/00
(52) U.S. Cl. .............................. 429/34; 429/37; 429/30; 429/12; 429/157; 429/183
(58) Field of Search .............................. 429/12, 34, 37, 429/30, 157, 183

(56) References Cited

U.S. PATENT DOCUMENTS 6,190,793 B1 * 2/2001 Barton et al. .................. 429/34

FOREIGN PATENT DOCUMENTS

| JP | 02000067884 A | * | 3/2000 |
| JP | 02000067887 A | * | 3/2000 |

* cited by examiner

*Primary Examiner*—Gabrielle Brouillette
*Assistant Examiner*—Angela J. Martin
(74) *Attorney, Agent, or Firm*—John P. White; Cooper & Dunham LLP

(57) ABSTRACT

Disclosed is a fuel cell stack, comprising a fuel cell laminate body prepared by laminating a plurality of unit cells each having a solid polymer membrane sandwiched between electrodes and a fastening means for fastening the fuel cell laminate body in the direction of lamination of the unit cells, wherein the fastening means includes support members equipped with flanges and arranged at the upper and lower edges of the fuel cell laminate body, thin plates joined to the support members at the upper and lower end portions of the fuel cell laminate body, and fastening bolts for fastening the support members in the vertical direction of the fuel cell laminate body.

9 Claims, 7 Drawing Sheets

FUEL CELL STACK WITH FASTENING MEANS INCLUDING SUPPORT MEMBERS AND FLANGES

CROSS-REFERENCE TO RELATED APPLICATIONS

This application is based upon and claims the benefit of priority from the prior Japanese Patent Application No. 11-109186, filed Apr. 16, 1999, the entire contents of which are incorporated herein by reference.

BACKGROUND OF THE INVENTION

The present invention relates to a fuel cell stack prepared by making integral a fuel cell laminate body consisting of a plurality of solid polymer type fuel cells each having a solid polymer membrane by a fastening means.

In recent years, the number of motor cars using gasoline engines has rapidly increased such that about two motor cars are owned nowadays by each family. Naturally, the exhaust gas discharged from the motor car attracts social attentions in relation to the air pollution problem. Under the circumstances, vigorous studies are being made in an attempt to use a fuel cell as a power source of a motor that is used in place of the internal combustion engine. The air pollution problem need not be worried about in the motor car using the fuel cell, which does not use a fossil fuel. In addition, noise is scarcely generated from the motor using the fuel cell. Also, the motor using the fuel cell is advantageous over the internal combustion engine in the energy recovery rate.

In using the fuel cell in a motor car, it is desirable for the fuel cell and the auxiliary facilities to be as small as possible, though an unduly large output is not required. Such being the situation, PEFC (polymer electrolyte fuel cell), in which a solid polymer membrane is sandwiched between two kinds of electrodes and these electrodes are wrapped in a separator, attracts attentions among various fuel cells.

FIG. 7 shows the basic construction of a solid polymer type fuel cell. As shown in the drawing, a cell body 1 comprises a solid polymer membrane 2. An oxygen electrode 3 and a hydrogen electrode 4 are attached to both surfaces of the solid polymer membrane 2 to form an integral structure. The integral structure is prepared by attaching the oxygen electrode 3 and the hydrogen electrode 4 to both surfaces of the solid polymer membrane 2, followed by applying a hot press to the resultant structure. A reaction membrane 5a and a gas diffusion membrane 6a are attached to both surfaces of the oxygen electrode 3 such that the reaction membrane 5a is in contact with the solid polymer membrane 2. Likewise, a reaction membrane 5b and a gas diffusion membrane 6b are attached to both surfaces of the hydrogen electrode 4 such that the reaction membrane 5b is in contact with the solid polymer membrane 2. The cell reaction takes place mainly between the solid polymer membrane 2 and the reaction membranes 5a, 5b. A separator 7 having oxygen supply grooves 7a is attached to the surface of the oxygen electrode 3. Likewise, a separator 8 having hydrogen supply grooves 8a is attached to the surface of the hydrogen electrode 4.

In the fuel cell of the particular construction, oxygen and hydrogen introduced through the oxygen supply grooves 7a and the hydrogen supply grooves 8a are supplied through the gas diffusion membranes 6a, 6b into the reaction membranes 5a, 5b, respectively. As a result, reactions given below take place at the interface A between the solid polymer membrane 2 and the reaction membrane 5a and at the interface B between the solid polymer membrane 2 and the reaction membrane 5b:

Reaction at interface A: $(1/2)O_2 + 2H^+ \rightarrow H_2O$

Reaction at interface B: $H_2 \rightarrow 2H^+ + 2e^-$

The hydrogen ions ($2H^+$) generated at the interface B flow from the hydrogen electrode 4 into the oxygen electrode 3 through the solid polymer membrane 2. On the other hand, the electrons ($2e^-$) generated at the interface B flow from the hydrogen electrode 4 into the oxygen electrode 3 through a load 9 so as to obtain an electric energy.

In the fuel cell of the construction described above, it is necessary for the separators 7 and 8 to supply an oxidizing gas and a fuel gas to the back surfaces of the oxygen electrode 3 and the hydrogen electrode 4, respectively, uniformly and in a completely separated manner. Also, it is necessary for the fuel cell to collect efficiently the electivity generated by the reaction. Further, since heat is generated by the cell reaction, it is necessary to release the reaction heat through the gas separators in order to stabilize the power generating operation. Various separators are proposed for meeting these requirements. FIG. 8 exemplifies the PEFC structure (fuel cell laminate body) using a plurality of separators S. In the fuel cell stack of the construction shown in the drawing, a fuel gas supply plate 19 is attached to an oxidizing gas supply plate 20 such that a fluid passageway 21 is defined between these supply plates 19 and 20. A cooling water is circulated through the fluid passageway 21 to suppress the temperature elevation caused by the reaction heat generated at the boundaries between the oxygen electrode and the solid polymer electrolyte plate and between the hydrogen electrode and the solid polymer electrolyte plate.

It was customary in the past to assemble the fuel cell stack 11 as shown in, for example, FIGS. 9 and 11. Incidentally, FIG. 11 is a plan view showing the fuel cell stack 11 shown in FIG. 9. The fuel cell stack 11 comprises a plurality of unit cells 10 stacked one upon the other in the vertical direction and upper and lower flanges 12, 13 somewhat larger than the unit cell 10 and positioned on the upper and lower surfaces, respectively, of the stack of the unit cells 10. Each of these upper and lower flanges 12, 13 is provided with a plurality of bolt holes positioned outside the stack of the unit cells 10. Fastening bolts 14 are inserted into the bolt holes to permit these bolts 14 to extend through the upper and lower flanges 12, 13, and nuts (not shown) are engaged at the end portions of the fastening bolts 14 so as to fasten the stack of the unit cells 10 held between the upper and lower flanges 12 and 13. Reference numerals 15 and 16 shown in FIG. 11 represent a cooling water supply hole and a cooling water discharge hole, respectively, which extend through the flanges 12, 13 and the fuel cell stack 11. Also, reference numerals 17 and 18 represent a reactant gas supply hole and a reaction gas discharge hole, respectively, which extend through the flanges 12, 13 and the fuel cell stack 11.

The conventional fuel cell laminate body is assembled as shown in, for example, FIG. 10 to constitute the fuel cell stack 11. The stack shown in FIG. 10 is equal to the stack shown in FIG. 9, except that, in FIG. 10, the flanges 12, 13 are equal in size to the unit cell 10.

The conventional fuel cell stack is defective in that, since a large number of fastening bolts 14 are used for fastening the fuel cell laminate body, the effective area ratio of the fuel cell stack is low. For example, where the fuel cell stack shown in FIG. 9 including the region of the fastening bolts 14 has a length $Y_1$ of, for example, 140 mm, and a width $T_1$ of, for example 120 mm, the region of the unit cell 10, which is shaded in FIG. 11, has a length $Y_2$ of, for example, 130 mm, and a width $T_2$ of, for example, 100 mm. It follows that the effective area ratio is: $T_2 \cdot Y_2/T_1 \cdot Y_1 = \{(100\times130)/(120\times140)\}\times100 \approx 77\%$. Also, the conventional fuel cell stack is rendered heavier and more bulky.

Fuel cells are also disclosed in Japanese Patent Disclosure (Kokai) No. 10-189025 and Japanese Patent Disclosure No. 9-92324. JP '025 is directed to a fuel cell in which the direction of the pressurizing force applied to the fuel cell stack housed in a case is kept parallel to the stacking direction of the unit cells so as to prevent the gas sealing properties from being deteriorated and to prevent the contact resistance from being increased. On the other hand, JP '324 is directed to a fuel cell module and a fuel cell in which pushing force is applied to a laminate body of unit cells without using a fastening tool such as a bolt so as to make compact the fuel cell module and the fuel cell.

BRIEF SUMMARY OF THE INVENTION

An object of the present invention is to provide a fuel cell stack, comprising a fastening means including support members equipped with flanges arranged at upper and lower edge portions of a fuel cell laminate body, connecting members joined to the support members and extending in the vertical direction of the fuel cell laminate body, and fastening tools for fastening the support members in the vertical direction of the fuel cell laminate body. The particular construction of the present invention makes it possible to increase the effective area ratio of the fuel cell stack, compared with the conventional fuel cell stack. In addition, the fuel cell stack of the present invention is light in weight and small in outer size.

According to the present invention, there is provided a fuel cell stack, comprising a fuel cell laminate body prepared by laminating a plurality of unit cells each having a solid polymer membrane sandwiched between electrodes and a fastening means for fastening the fuel cell laminate body in the direction of lamination of the unit cells, wherein the fastening means includes support members equipped with flanges and arranged at the upper and lower edges of the fuel cell laminate body, connecting members joined to the support members at the upper and lower end portions of the fuel cell laminate body, and fastening tools for fastening the support members in the vertical direction of the fuel cell laminate body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
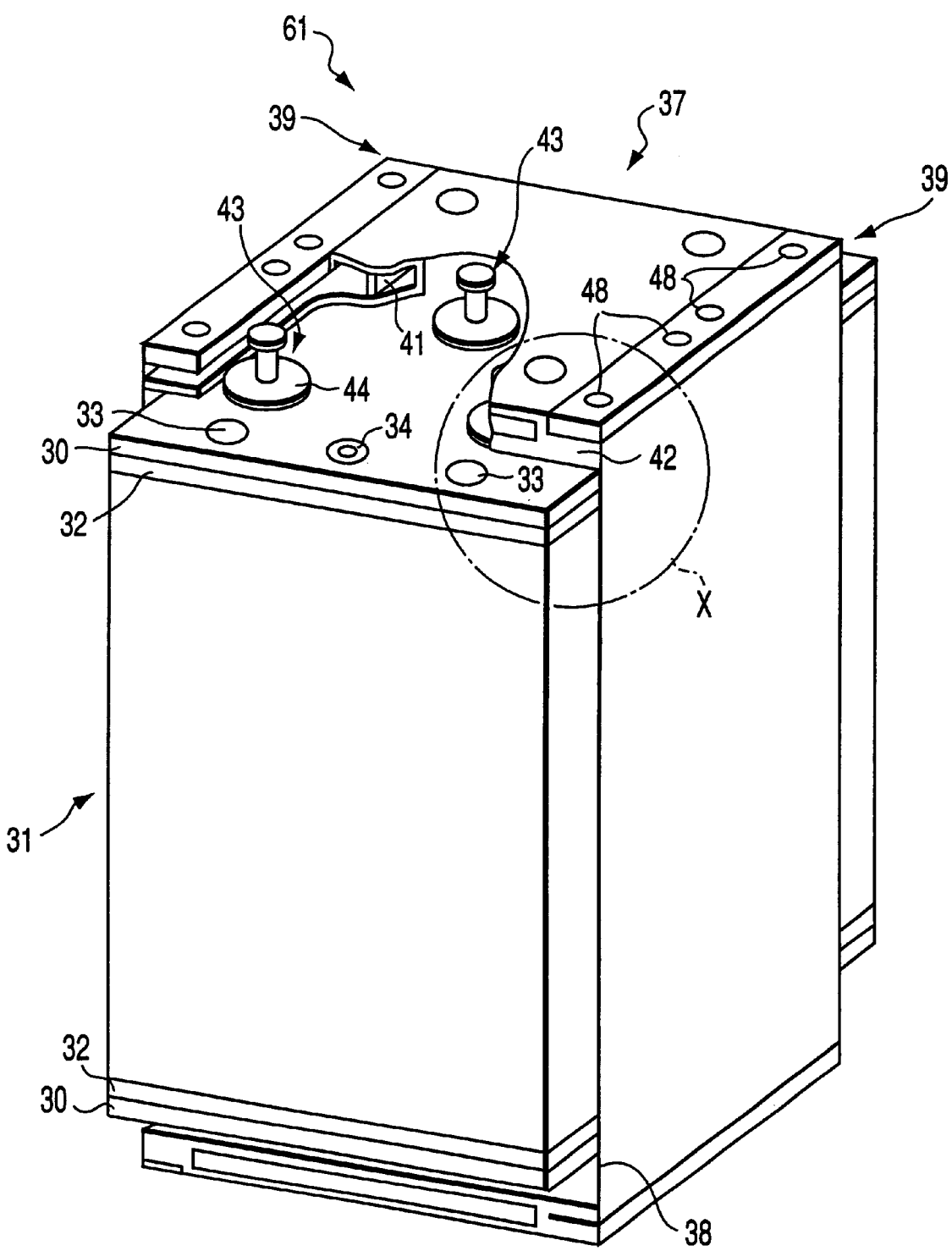
FIG. 1 is an oblique view, partly broken away, showing a fuel cell stack according to Example 1 of the present invention.

The fuel cell stack of the present invention comprises a fuel cell laminate body consisting of a plurality of unit cells laminated one upon the other, each unit cell consisting of electrodes arranged on both sides a solid polymer membrane, and fastening means for fastening the fuel cell laminate body in the laminating direction of said unit cells, wherein said fastening means includes support members each provided with a flange and arranged on the upper and lower ends of the fuel cell laminate body, connecting members joined to said support members and arranged to extend along the side surfaces of the fuel cell laminate body, and fastening means for fastening said support members in the laminating direction of the fuel cell laminate body.

The present invention will now be described more in detail.

The fuel cell stack of the present invention comprises a fastening means for fastening a fuel cell laminate body consisting of a plurality of unit cells laminated one upon the other in the direction of lamination of the unit cells. Therefore, for simplifying the construction, it is desirable for the upper and lower edge portions of the fastening member to be equal to each other in construction, though it is not absolutely necessary for these upper and lower edge portions to be equal to each other in construction.

The fastening member includes support members equipped with flanges arranged at upper and lower edge portions of a fuel cell laminate body, connecting members joined to the support members and extending in the vertical direction of the fuel cell laminate body, and fastening tools for fastening the support members in the vertical direction of the fuel cell laminate body.

The support member equipped with flanges includes, for example, a hollow body, a rib arranged within the hollow body, flanges joined to both sides of the hollow body, and a pushing member mounted within the hollow body. The rib is arranged between the upper and lower walls of the hollow body so as to reinforce the hollow body. The pushing member comprises a dish spring, a holding plate arranged above the dish spring, and a dish spring bolt arranged above the holding plate, as shown in, for example, FIG. 3. It is desirable for the pushing member to be arranged in good balance to permit the pushing force of the fastening member to be transmitted uniformly to the pushing surface of the fuel cell laminate body. Incidentally, a leaf spring, a spiral spring, etc. can be used in place of the dish spring as far as the pushing force of the pushing member can be transmitted uniformly to the pushing surface of the fuel cell stack.

In the present invention, a plate-like member made of a stainless steel, a musical wire, etc. can be used as the connection member. The plate-like member can be joined to the support member by welding or by a mechanical engagement. A single musical wire may be joined to the support members at the upper and lower edge portions of the fuel cell laminate body. Alternatively, a plurality of musical wires may be joined to the support members.

Figure 3:
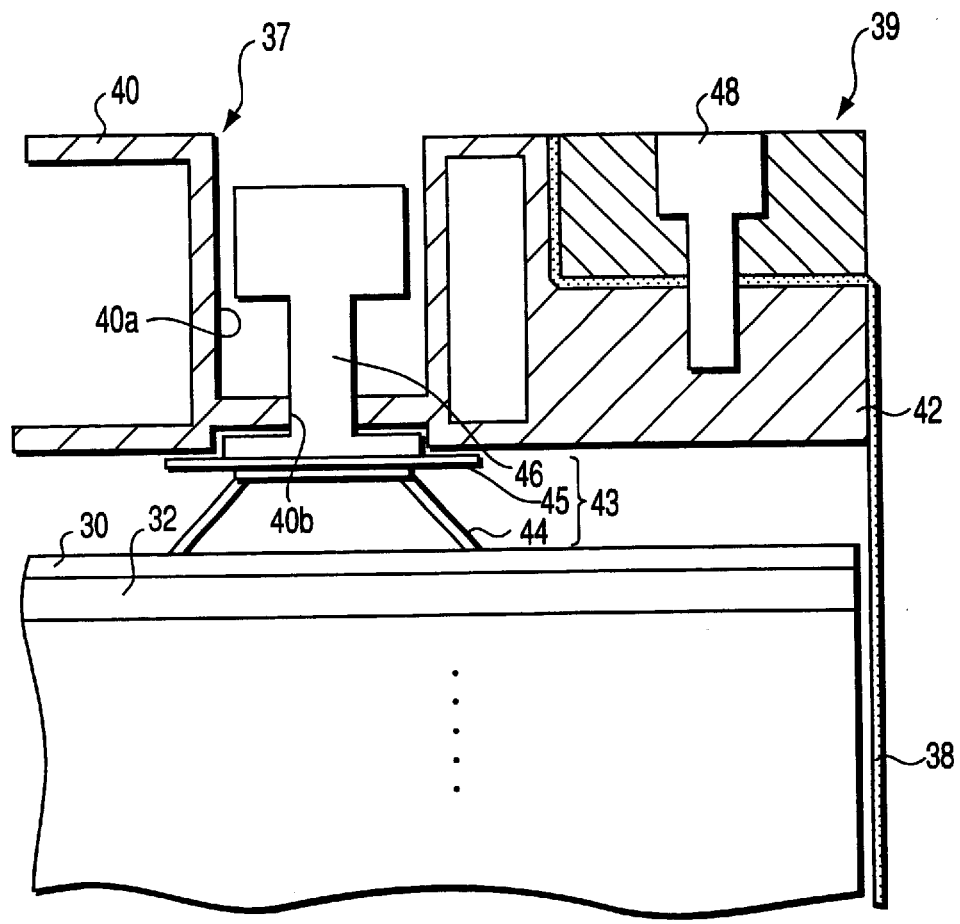
FIG. 3 is a cross sectional view showing in a magnified fashion a gist portion X of the fuel cell stack shown in FIG. 1.
Figure 4:
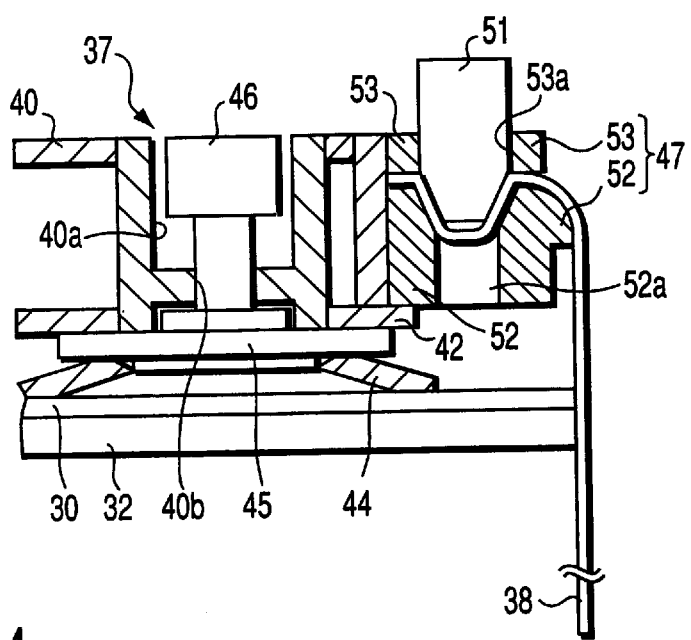
FIG. 4 is a cross sectional view showing a gist portion of a fuel cell stack according to Example 2 of the present invention.
Figure 5:
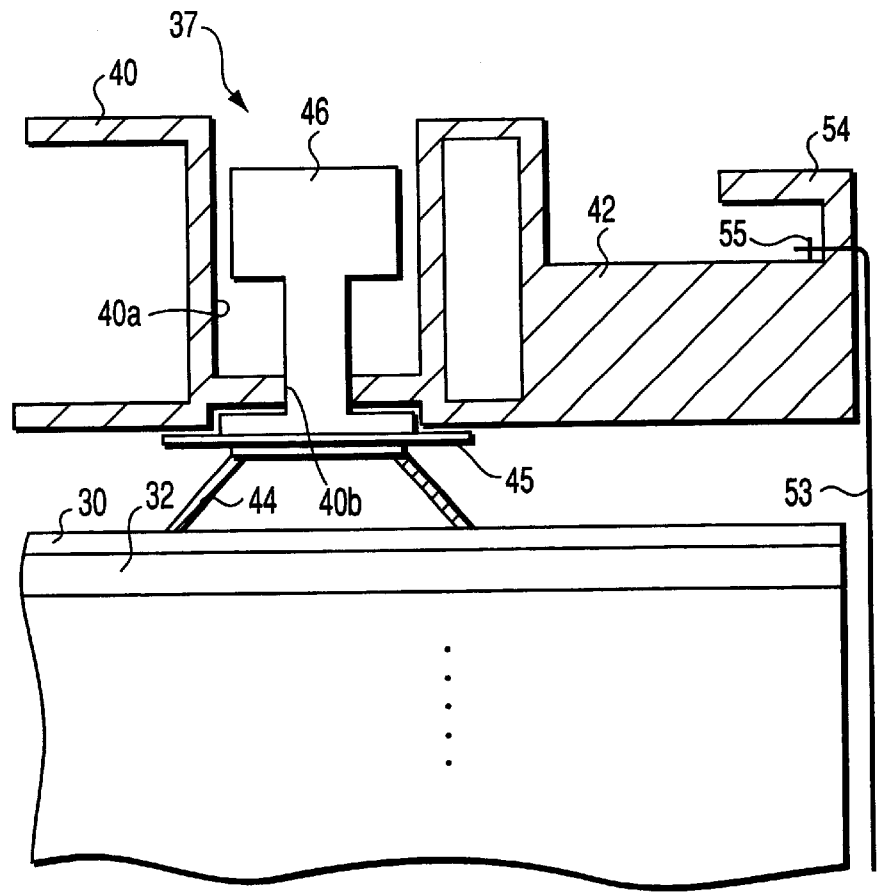
FIG. 5 is a cross sectional view showing a gist portion of a fuel cell stack according to Example 3 of the present invention.
Figure 6:
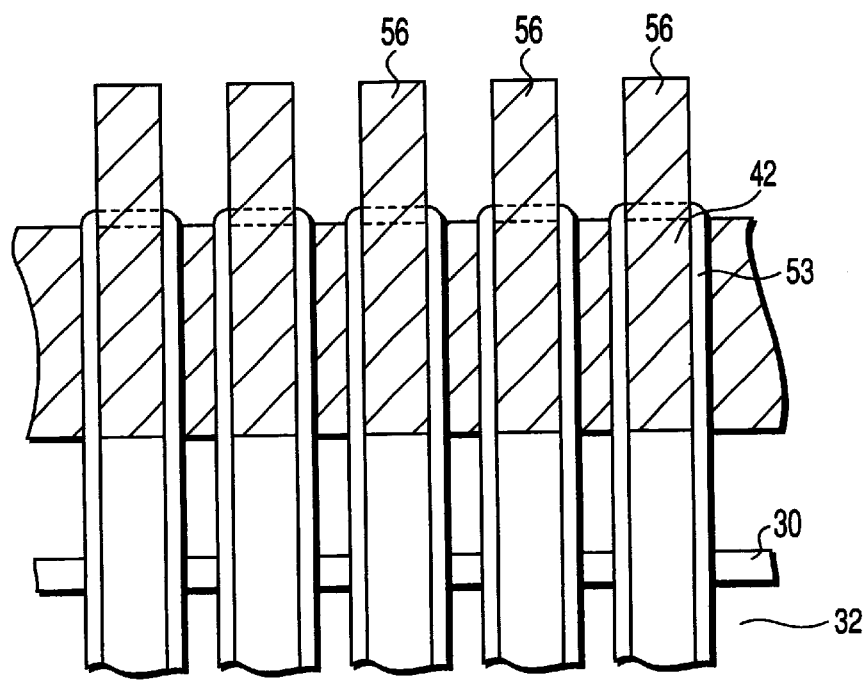
FIG. 6 is a cross sectional view showing a gist portion of a fuel cell stack according to Example 4 of the present invention.

In the present invention, it is desirable for the fastening tool, which serves to fasten the fuel cell laminate body in the direction of lamination of the unit cells, to be capable of transmitting an appropriate pushing force to the flange portion of the support member. To be more specific, it is desirable for the fastening tool to be constructed such that the connection member is interposed between a holding tool provided with a threaded hole and the flange, and the pushing force generated by the fixing bolt is transmitted to the fuel cell laminate body, as shown in FIG. 3. Alternatively, it is possible to employ the construction to use the holding member consisting of two kinds of holding tools and the fixing bolt as shown in FIG. 4. Further, it is possible to employ the construction to use a hook for fixing a single or a plurality of music wires, as shown in FIG. 5 or 6.

Some Examples of the present invention will now be described with reference to the accompanying drawings.

EXAMPLE 1

Figure 2:
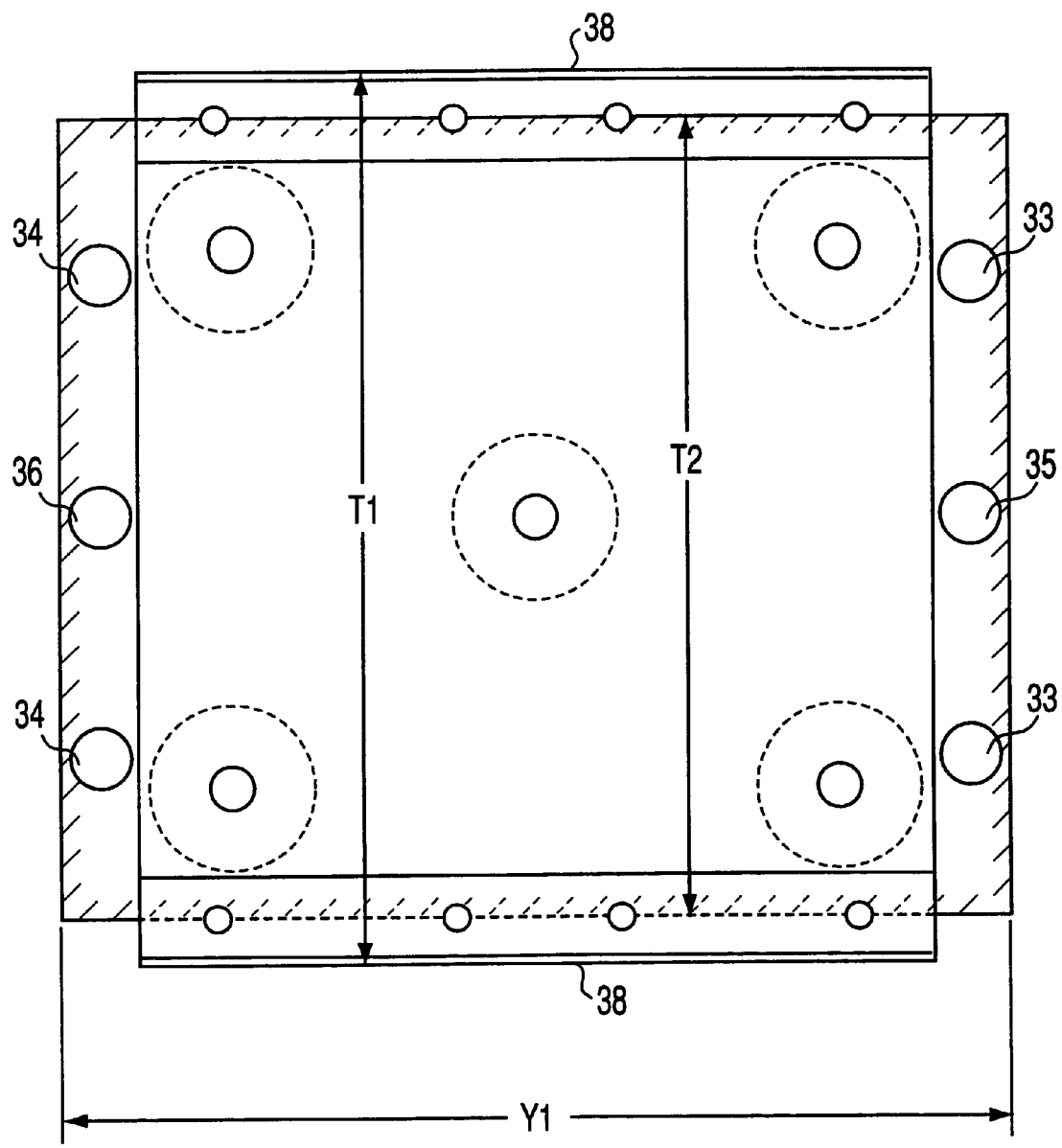
FIG. 2 is a plan view showing the fuel cell stack shown in FIG. 1.

FIGS. 1 to 3 collectively show a fuel cell stack of Example 1 of the present invention, wherein FIG. 1 is an oblique view, partly broken away, showing a fuel cell stack according to Example 1 of the present invention, FIG. 2 is a plan view showing the fuel cell stack shown in FIG. 1 excluding the support member, and FIG. 3 is a cross sectional view showing in a magnified fashion a gist portion X shown in FIG. 1. The fastening means used in Example 1 extends through the fuel cell stack. The construction of the fastening means on the upper surface of the fuel cell stack is equal to that on the lower surface of the fuel cell stack.

Figure 7:
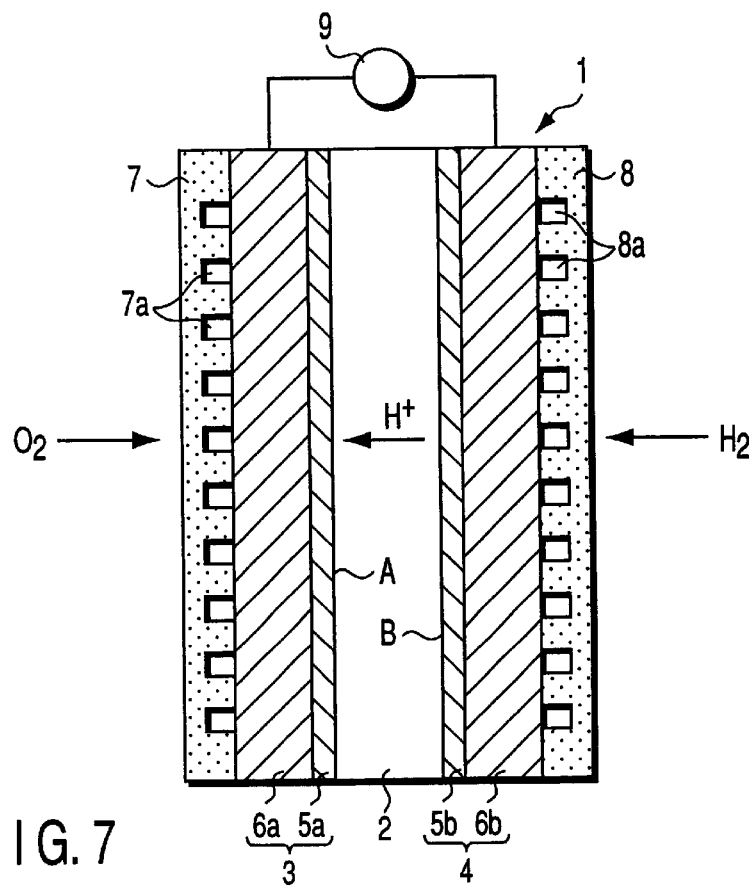
FIG. 7 shows the principle of a solid polymer type fuel cell.
Figure 8:
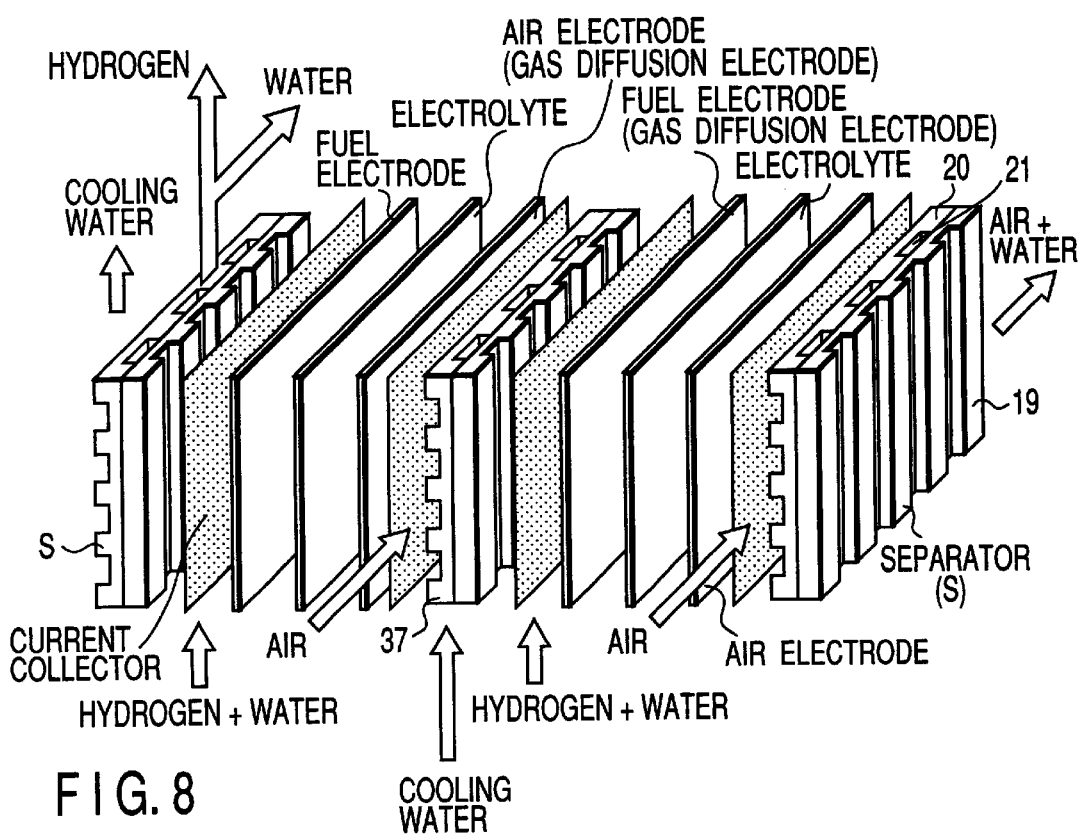
FIG. 8 shows the construction of a solid polymer type fuel cell stack.
Figure 9:
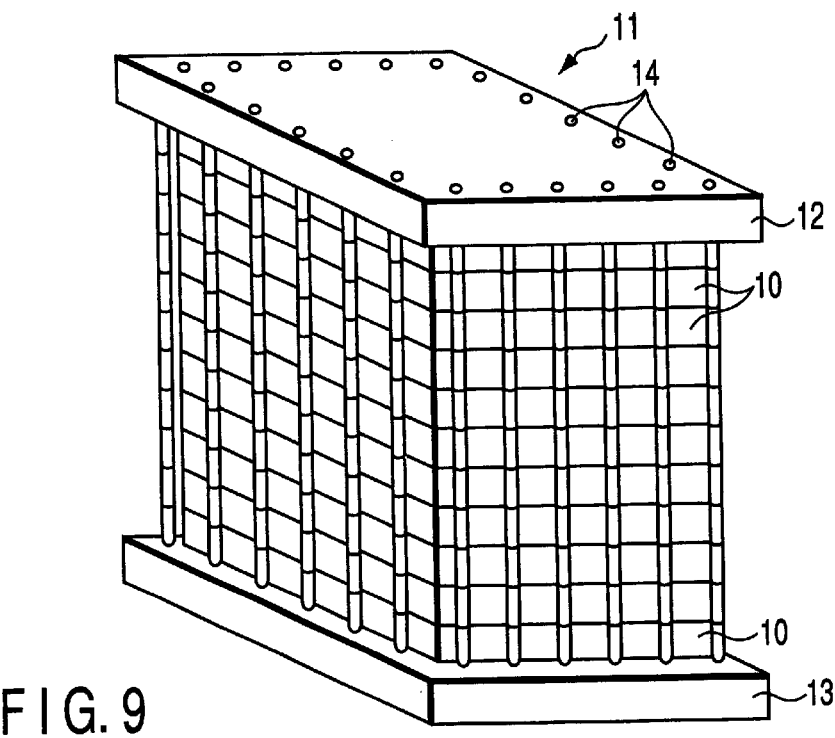
FIG. 9 is an oblique view showing a conventional fuel cell stack.
Figure 10:
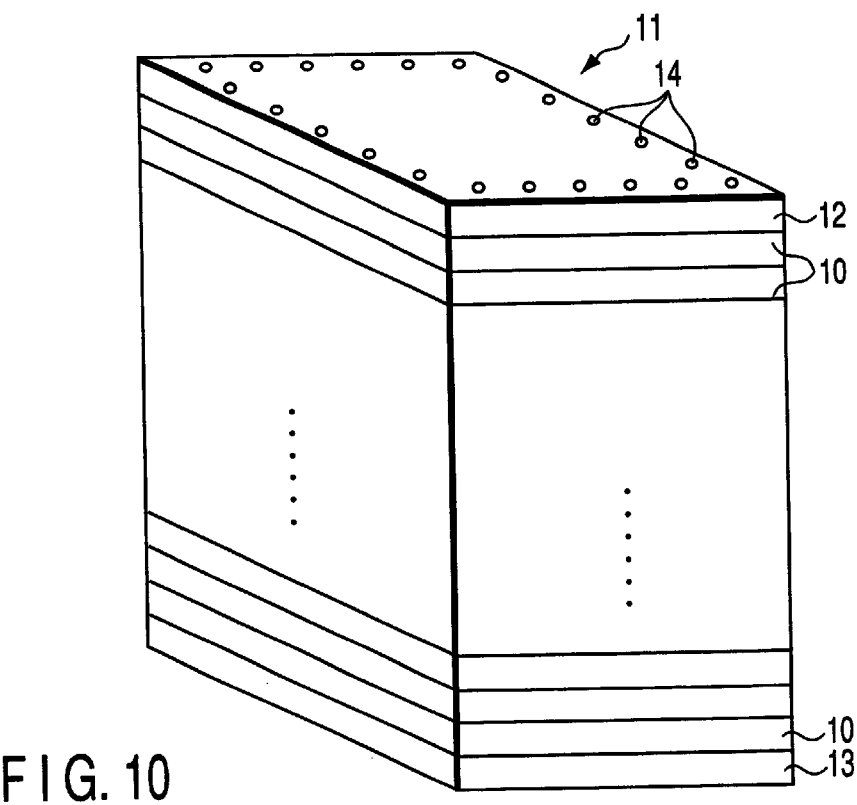
FIG. 10 is an oblique view showing another conventional fuel cell stack.
Figure 11:
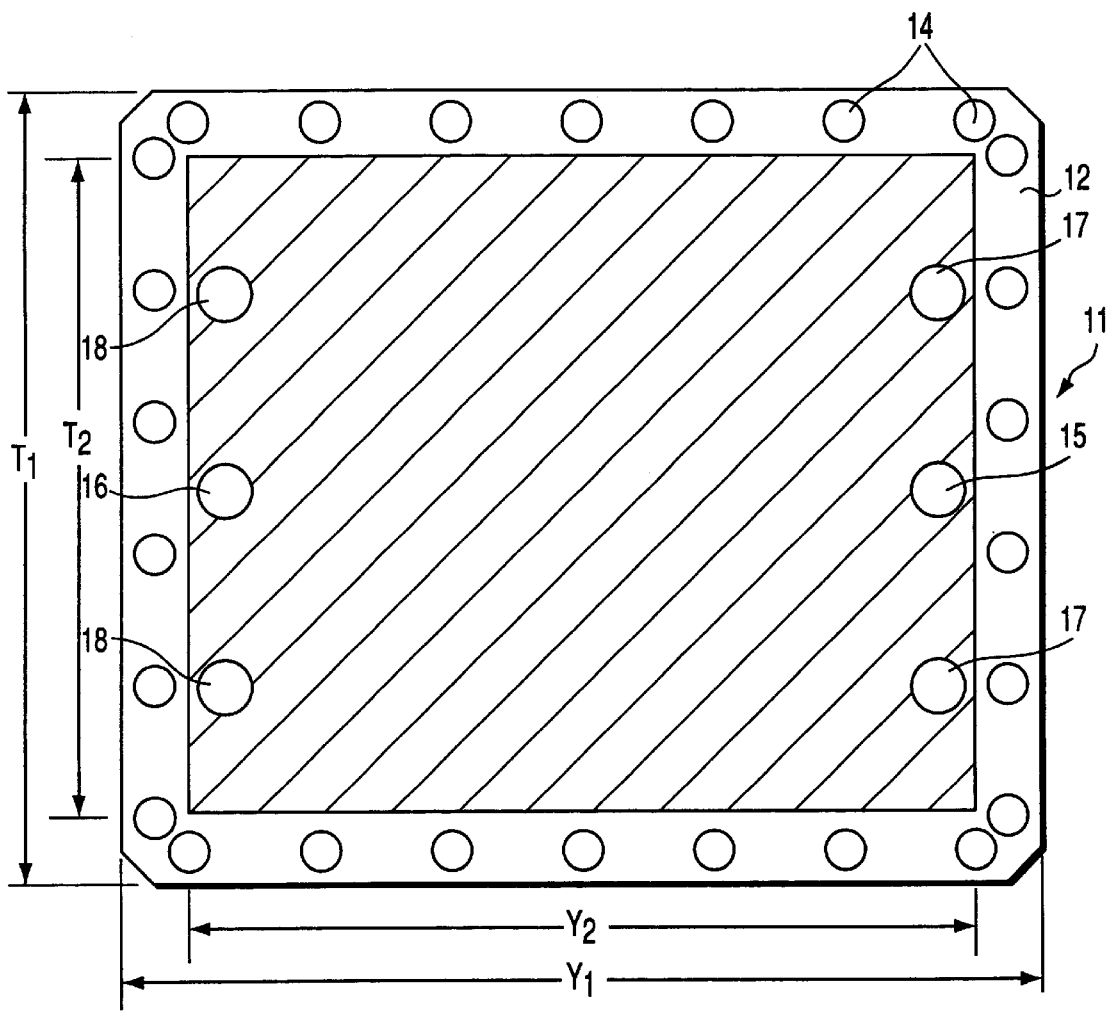
FIG. 11 is a plan view showing the conventional fuel cell stack shown in FIG. 9.

Reference numeral 31 shown in FIG. 1 denotes a fuel cell laminate body prepared by laminating a plurality of unit cells 32 in a vertical direction. Only the uppermost and lowermost unit cells 32 are shown in FIG. 1 for simplifying the drawing. The unit cell 32 comprises a solid polymer membrane (not shown), an oxygen electrode (not shown) arranged on one surface of the solid polymer membrane, a hydrogen electrode (not shown) arranged on the other surface of the solid polymer membrane, and separators arranged on the outer surfaces of the oxygen electrode and the hydrogen electrode. The basic construction and function of the unit cell 32 are equal to those described previously in conjunction with FIG. 7. First holding plates 30 are arranged on the upper and lower surfaces of the fuel cell laminate body 31. Reactant gas supply holes 33 for supplying a reactant gas into the unit cells 32, reaction gas discharge holes 34 for discharging the reaction gas, a cooling water supply hole 35 for supplying a cooling water into the unit cells 32 and a cooling water discharge hole 36 are formed to extend vertically through the holding plates 30 and the fuel cell laminate body 31.

The fuel cell laminate body 31 is fastened by the fastening means in the direction of lamination. The fastening means comprises support members 37 equipped with flanges and arranged on the upper and lower surfaces of the laminate body 31, connecting members (thin plates) 38 made of stainless steel thin plates each having a thickness of 1.0 mm and fixed to the edge portions of the upper and lower support members 37, and a fastening tool 39 for fastening the connection members (thin plates) 38 in the vertical direction of the laminate body 31. The fuel cell laminate body 31 and the fastening means collectively form a fuel cell stack 61.

The support member 37 comprises a plate-like hollow body 40, a rib 41 arranged within the hollow body 40, flanges 42 joined to both edges of the hollow body 40, and a push control member 43 arranged within the hollow body 40. The push control member 43 comprises a dish spring 44 acting as a pushing force adjusting member and arranged between the bottom surface of the hollow body 40 and the upper surface of the stack 31, a second holding plate 45 arranged on the dish spring 44, and a dish spring bolt 46. For arranging the dish spring bolt 46, a bolt hole 40b is made in a recess 40a formed at a portion of the hollow body 40, and the dish spring bolt 46 is arranged by utilizing the bolt hole 40b so as to be positioned above the dish spring 44.

The fastening tool 39 comprises a holding tool 47 (see FIG. 4) for holding the thin plates 38 folded at the upper and lower edges and fixing bolts 48 (see FIG. 3) for fastening the holding tool 47, the thin plates 38 and the flanges 42. The fixing bolt 48 is engaged by screw engagement with threaded holes 47a made in the holding tool 47 and the flange 42 and with threaded hole 38a made in the thin plate 38. If the fastening bolt 48 is fastened, pushing force is exerted on the flange 42 and, then, on the dish spring 44 positioned below the dish spring bolt 46, with the result that the fuel cell stack 31 is fastened in the direction of lamination.

As described above, the fuel cell stack in Example 1 of the present invention comprises the fastening means consisting of the support members 37 equipped with flanges arranged at the upper and lower edge portions of the fuel cell laminate body 31, the thin plates 38 joined to the support members 37 at the upper and lower edges of the fuel cell laminate body, and the fastening tool 39 for fastening the thin plates in the vertical direction of the fuel cell laminate body 31. The support member 37 comprises the plate-like hollow body 40, the rib 41 arranged within the hollow body 40, the flanges 42 jointed to both edges of the hollow body 40, and the push control member 43 arranged within the hollow body 40. Further, the fastening tool 39 comprises the holding tool 47 for holding the thin plate 38 folded at the edge portions, the fixing bolt 48 for fastening the holding tool 47, the thin plate 38 and the flange 42.

In the fuel cell module of Example 1, the fuel cell stack 31 is fastened by the fixing bolt 48 for fastening the thin plate 38 and the dish spring bolt 44 for uniformly pushing the end surface of the stack without using such a long bolt as used in the prior art. As a result, the entire module is made lightweight, and the effective area ratio can be increased.

As a matter of fact, the effective area ratio of the fuel cell stack in Example 1 was determined as in FIG. 2. Specifically, the stack had a length $Y_1$ of 130 mm and a width $T_1$ of 112 mm. On the other hand, the cell region shaded in FIG. 2 had a length $Y_1$ of 130 mm and a width $T_2$ of 100 mm. It follows that the effective area ratio, i.e., $Y_1 \cdot T_2/Y_1 \cdot T_1 \times 100(\%)$, was $\{(130 \times 100)/(130 \times 112)\} \times 100 \approx 89\%$. On the other hand, the effective area ratio for the conventional fuel cell stack was about 77% as described previously. Clearly, the fuel cell stack of the present invention permits improving the effective area ratio. In addition, the present invention permits diminishing the weight and outer size of the fuel cell stack.

In Example 1, a fixing bolt is used for fixing the thin plate to the flange. However, it is also possible to use welding for fixing the thin plate to the flange. Further, the thickness and material of the thin plate are not limited to those described previously.

Also, in Example 1, the push control member using a dish spring was used in 5 points. However, the number of push control members is not particularly limited, as far as the force produced by the fixing bolt is transmitted uniformly onto the upper and lower ends of the fuel cell stack. For example, it suffices to use only one push control member or four push control members as far as the force produced by the fixing bolt is transmitted uniformly onto the upper and lower ends of the fuel cell stack. Further, the dish spring can be replaced by, for example, a spiral spring.

EXAMPLE 2

A fuel cell stack of Example 2 is shown in FIG. 4. Those portions of the fuel cell stack which are equal to those shown in FIGS. 1 to 3 are denoted by the same reference numerals so as to avoid an overlapping description. In Example 2, the holding tool 47 comprises a lower holding member 52 provided with an opening 52a into which a fixing bolt 51 is inserted and an upper holding member 53 arranged above the lower holding member 52 and provided with a bolt hole 53a that is engaged with the fixing bolt 51. The upper edge portion of the thin plate 38 is folded at the edge portion of the lower holding member 52 to extend far into the clearance between the lower and upper holding members 52, 53. Then, the fixing bolt 51 is screwed through the bolt hole 53a of the upper holding member 53 so as to permit the thin plate 38 to be partly pushed toward the flange within an opening 52a of the lower holding member 52, thereby strongly fastening the thin plate 38.

If the fixing bolt 51 is fastened in Example 2, the fastening force is transmitted to the second holding plate 45 through the holding tool 47 and the flange 42. Further, the fastening force exerts on the dish spring 44 positioned below the bolt 46. As a result, the unit cells of the fuel cell stack 31 is pushed in the direction of lamination. Therefore, the weight of the entire module can be decreased in Example 2 as in Example 1, making it possible to ensure a sufficiently large effective area ratio.

In Example 2, the lower holding member 52 is welded to the flange 42 for forming an integral structure. Alternatively, the integral structure can be formed by, for example, molding.

EXAMPLE 3

A fuel cell stack of Example 3 is shown in FIG. 5. Those portions of the fuel cell stack which are equal to those shown in FIGS. 1 to 3 are denoted by the same reference numerals so as to avoid an overlapping description. In Example 3, a music wire 53 is used in place of the thin plate used in each of Examples 1 and 2, and the flange 42 is provided with a hook 54 for fixing the music wire 53, as shown in FIG. 5. The hook 54, which is formed integral with the flange 42, is shaped L in cross section. However, the shape of the hook 54 is not particularly limited. Also, a hole through which extends the music wire 53 is formed in the side wall of the hook 54, and a knot 55 is formed inside the hook 54 so as to prevent the edge portion of the music wire 53 from being withdrawn from the hole of the hook 54.

In Example 3, the weight of the entire module can be decreased with a simple construction as in Example 1, making it possible to ensure a sufficiently large effective area ratio.

EXAMPLE 4

A fuel cell stack of Example 3 is shown in FIG. 6. Those portions of the fuel cell stack which are equal to those shown in FIGS. 1 to 3 are denoted by the same reference numerals so as to avoid an overlapping description. In Example 4, a plurality of hooks 56 are formed integral with the flange 42 in the side wall of the flange 42. As shown in the drawing, the continuous music wire 53 ig alternately wound about the upper and lower hooks 56. Finally, both end portions of the music wire 53 are joined to each other.

Example 4 produces effects similar to those produced in Example 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell stack, comprising a fuel cell laminate body prepared by laminating a plurality of unit cells each having a solid polymer membrane sandwiched between electrodes and a fastening means for fastening the fuel cell laminate body in the direction of lamination of the unit cells, wherein the fastening means includes support members equipped with flanges and arranged at the upper and lower edges of the fuel cell laminate body, connecting members joined to the support members at the upper and lower end portions of the fuel cell laminate body, and fastening tools for fastening the support members in the vertical direction of the fuel cell laminate body.

2. The fuel cell stack according to claim 1, wherein said support member comprises a hollow body, a rib arranged within said hollow body, flanges joined to both ends of said hollow body, and a pushing force control member arranged within the hollow body.

3. The fuel cell stack according to claim 1, wherein said connecting member is a plate member made of stainless steel.

4. The fuel cell stack according to claim 1, wherein said connecting member consists of a music wire.

5. The fuel cell stack according to claim 1, wherein said fastening tool is a bolt joined by screw engagement to the flange portion of said support member.

6. The fuel cell stack according to claim 2, wherein said pushing force adjusting member is selected from the group consisting of a dish plate, a leaf spring and a spiral spring.

7. The fuel cell stack according to claim 3, wherein said plate member is bonded to said support member.

8. The fuel cell stack according to claim 4, wherein both ends of said music wire are fixed to the flange of said support member.

9. The fuel cell stack according to claim 4, wherein said music wire is alternately wound about a plurality of hooks formed integral with the upper and lower flanges of said support member, and both end portions of the music wire are finally joined to each other.

* * * * *